US012734443B2

(12) United States Patent
Sato

(10) Patent No.: US 12,734,443 B2
(45) Date of Patent: Sep. 15, 2026

(54) INFORMATION PROCESSING DEVICE, INFORMATION PROCESSING METHOD, AND PROGRAM

(71) Applicant: GREE, Inc., Tokyo (JP)

(72) Inventor: Shinya Sato, Kanagawa (JP)

(73) Assignee: GREE HOLDINGS, Inc., Tokyo (JP)

( * ) Notice: Subject to any disclaimer, the term of this patent is extended or adjusted under 35 U.S.C. 154(b) by 292 days.

(21) Appl. No.: 18/394,416

(22) Filed: Dec. 22, 2023

(65) Prior Publication Data

US 2025/0001295 A1 Jan. 2, 2025

(30) Foreign Application Priority Data

Jun. 29, 2023 (JP) ................................ 2023-106621

(51) Int. Cl.

*A63F 13/5258* (2014.01)
*A63F 13/5255* (2014.01)
*G06T 15/20* (2011.01)
*A63F 13/822* (2014.01)

(52) U.S. Cl.

CPC ...... *A63F 13/5258* (2014.09); *A63F 13/5255* (2014.09); *G06T 15/20* (2013.01); *A63F 13/822* (2014.09); *G06T 2200/24* (2013.01)

(58) Field of Classification Search

CPC .............. A63F 13/5255; A63F 13/5258; A63F 13/822; A63F 13/525; A63F 13/5252; G06T 15/20; G06T 2200/24

See application file for complete search history.

(56) References Cited

U.S. PATENT DOCUMENTS 6,280,323 B1 * 8/2001 Yamazaki ........... A63F 13/5255 463/31
6,612,930 B2 * 9/2003 Kawagoe ............ A63F 13/5258 463/33
11,244,499 B2 2/2022 Yonezu
2004/0219980 A1 * 11/2004 Bassett .................. A63F 13/10 463/6

(Continued)

FOREIGN PATENT DOCUMENTS

JP 2004334850 A 11/2004
JP 2020080007 A 5/2020

(Continued)

OTHER PUBLICATIONS

Office Action issued on Aug. 26, 2025, in corresponding Japanese Application No. 2023-106621, 5 pages.

(Continued)

*Primary Examiner* — Steven J Hylinski
(74) *Attorney, Agent, or Firm* — Maier & Maier, PLLC

(57) ABSTRACT

An information processing system, method and device. The method includes: moving a display medium in a three-dimensional virtual space with a height direction; allowing a virtual camera to follow up the display medium when the display medium is moved; acquiring user input; setting the height of the virtual camera, in accordance with first user input; and drawing the display medium in the virtual space in an expression seen from the virtual camera, in which the camera processing changes a follow-up mode of the virtual camera with respect to the movement of the display medium when a setting value is changed.

16 Claims, 11 Drawing Sheets

(56) References Cited

U.S. PATENT DOCUMENTS

| | | | | |
|---|---|---|---|---|
| 2006/0250398 | A1* | 11/2006 | Akada | A63F 13/45 345/427 |
| 2007/0298881 | A1* | 12/2007 | Kawamura | A63F 13/833 463/33 |
| 2020/0151946 | A1* | 5/2020 | Nakajima | A63F 13/5252 |
| 2020/0298117 | A1* | 9/2020 | Yonezu | G06T 19/20 |
| 2022/0297006 | A1* | 9/2022 | Baba | A63F 13/2145 |

FOREIGN PATENT DOCUMENTS

| | | | | |
|---|---|---|---|---|
| JP | 2022187297 | A | 12/2022 | |
| KR | 102878269 | B1 * | 10/2025 | G06F 3/0481 |

OTHER PUBLICATIONS

Office Action issued on Dec. 2, 2025, in corresponding Japanese Application No. 2023-106621, 5 pages.

* cited by examiner

| HEIGHT PARAMETER H | FOLLOW-UP DEGREE PARAMETER A1 |
| --- | --- |
| 0 | $\beta 1$ |
| 5 | $\beta 2$ |
| 10 | $\beta 3$ |
| ... | ... |

FIG. 11

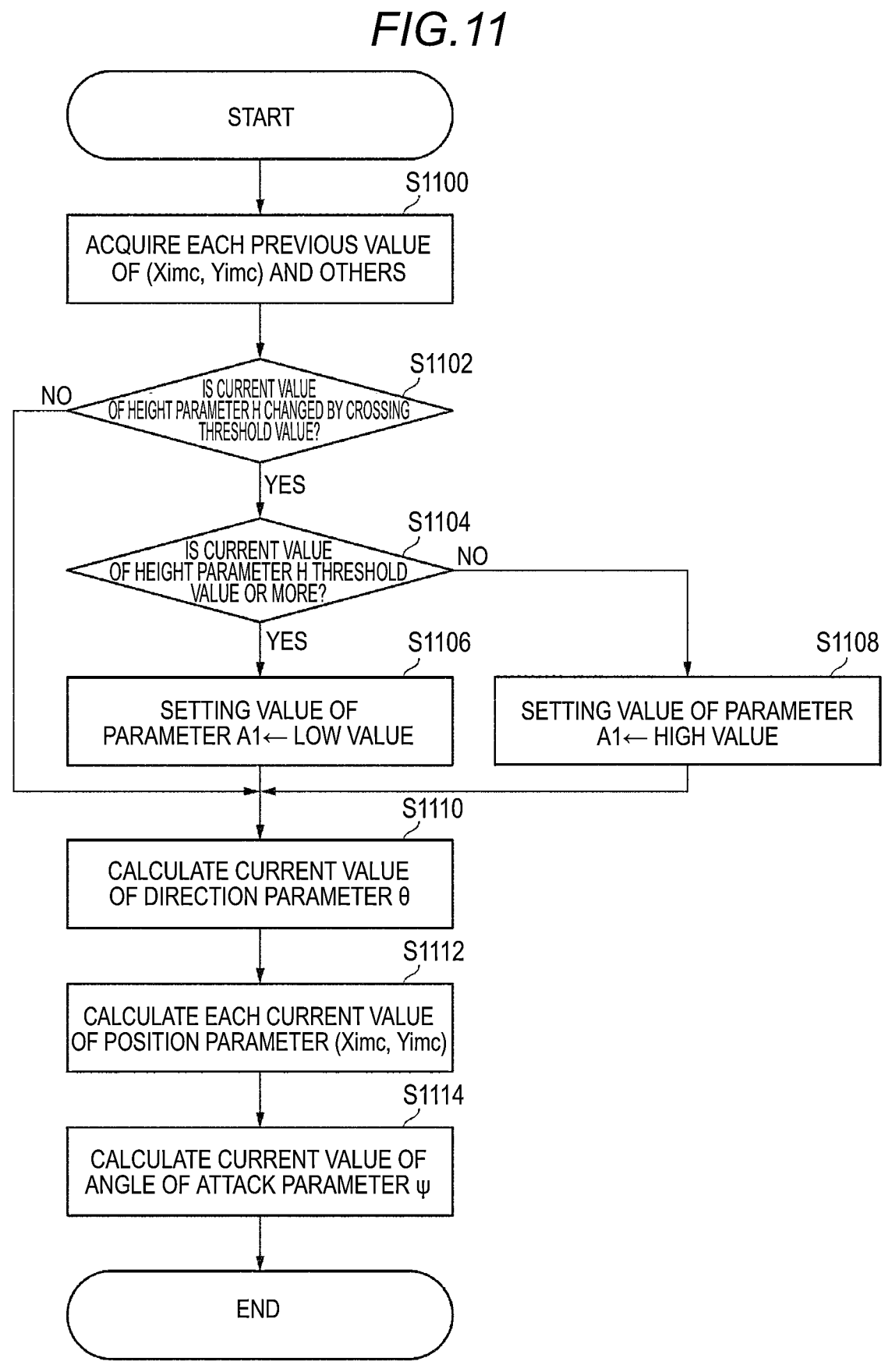

START
S1100
ACQUIRE EACH PREVIOUS VALUE OF (Ximc, Yimc) AND OTHERS
S1102
IS CURRENT VALUE OF HEIGHT PARAMETER H CHANGED BY CROSSING THRESHOLD VALUE?
NO
YES
S1104
IS CURRENT VALUE OF HEIGHT PARAMETER H THRESHOLD VALUE OR MORE?
NO
YES
S1106
SETTING VALUE OF PARAMETER A1← LOW VALUE
S1108
SETTING VALUE OF PARAMETER A1← HIGH VALUE
S1110
CALCULATE CURRENT VALUE OF DIRECTION PARAMETER θ
S1112
CALCULATE EACH CURRENT VALUE OF POSITION PARAMETER (Ximc, Yimc)
S1114
CALCULATE CURRENT VALUE OF ANGLE OF ATTACK PARAMETER ψ
END

INFORMATION PROCESSING DEVICE, INFORMATION PROCESSING METHOD, AND PROGRAM

FIELD

The present disclosure relates to an information processing device, an information processing method, and a program.

BACKGROUND

A technology of allowing a virtual camera to follow up the movement of a target object disposed in a virtual space is known.

SUMMARY

When a setting value of the height of the virtual camera can be changed by a user, there is a concern that a problem such as the degradation of visibility during the follow-up of the virtual camera occurs in a case where follow-up capability of the virtual camera is constant regardless of the height of the virtual camera.

Therefore, in one aspect, an object of the disclosure is to make follow-up capability of a virtual camera changeable in accordance with the height of the virtual camera, in a configuration where a setting value of the height of the virtual camera can be changed by a user.

Solution to Problem

In one aspect, a program allowing a computer to execute:

- medium processing of moving a display medium in a three-dimensional virtual space with a height direction;
- camera processing of allowing a virtual camera to follow up the display medium when the display medium is moved;
- acquisition processing of acquiring user input;
- camera height setting processing of setting a height of the virtual camera, in accordance with first user input; and
- drawing processing of drawing the display medium in the virtual space in an expression seen from the virtual camera,
- in which when a setting value according to the camera height setting processing is changed, the camera processing changes a follow-up mode of the virtual camera with respect to the movement of the display medium, is provided.

In one aspect, according to the disclosure, in the configuration where the setting value of the height of the virtual camera can be changed by the user, the follow-up capability of the virtual camera can be changed in accordance with the height of the virtual camera.

BRIEF DESCRIPTION OF THE DRAWINGS

FIG. 11 is a schematic flowchart illustrating an example of object follow-up processing that may be executed by a follow-up processing unit in another exemplary embodiment.

DETAILED DESCRIPTION

Figure 1A:
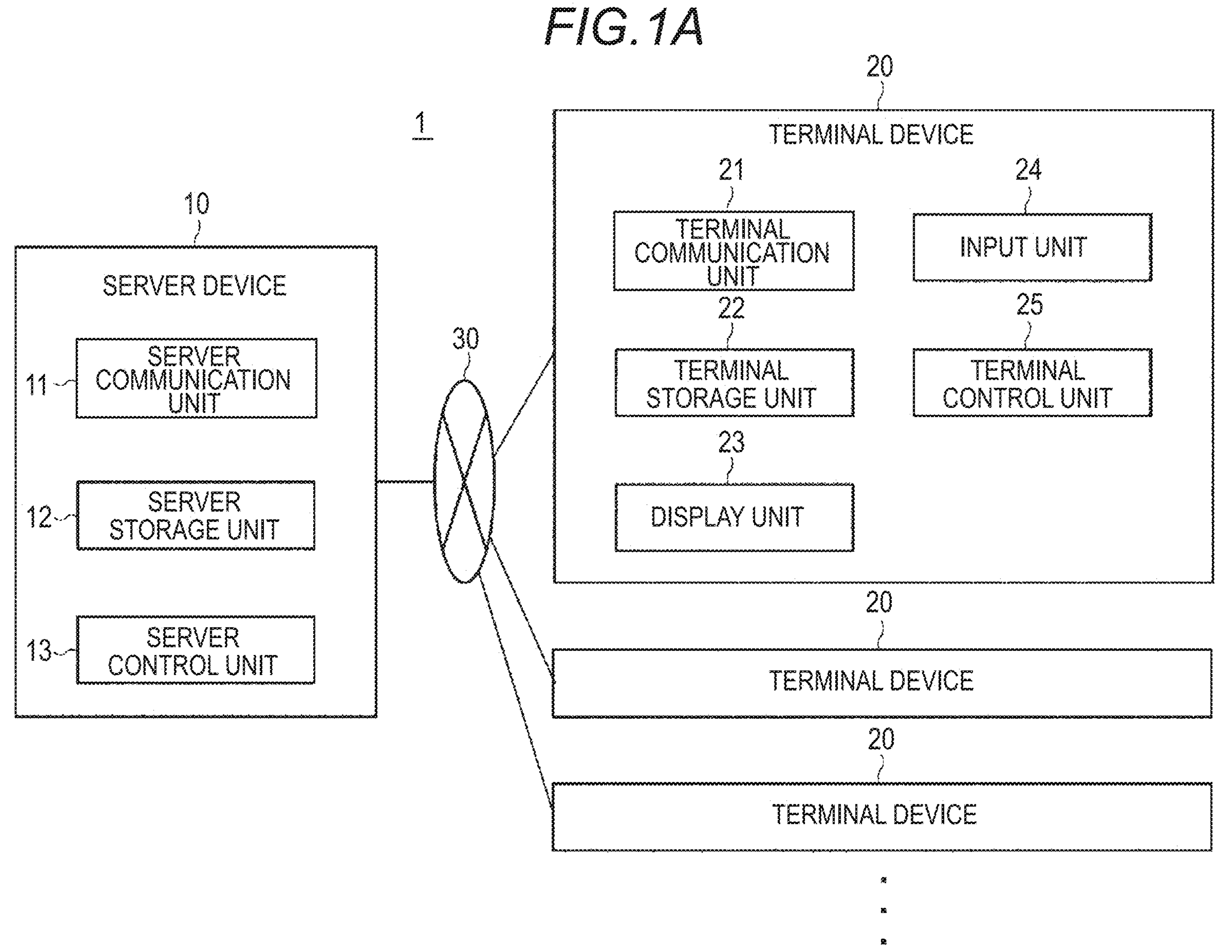
FIG. 1A is a block diagram of a game system according to this exemplary embodiment.

Hereinafter, each exemplary embodiment will be described in detail, with reference to the attached drawings. Note that, in the attached drawings, for viewability, a reference numeral may be applied to only a part of a plurality of parts with the same attribute.

(Outline of Game System)

Figure 2:
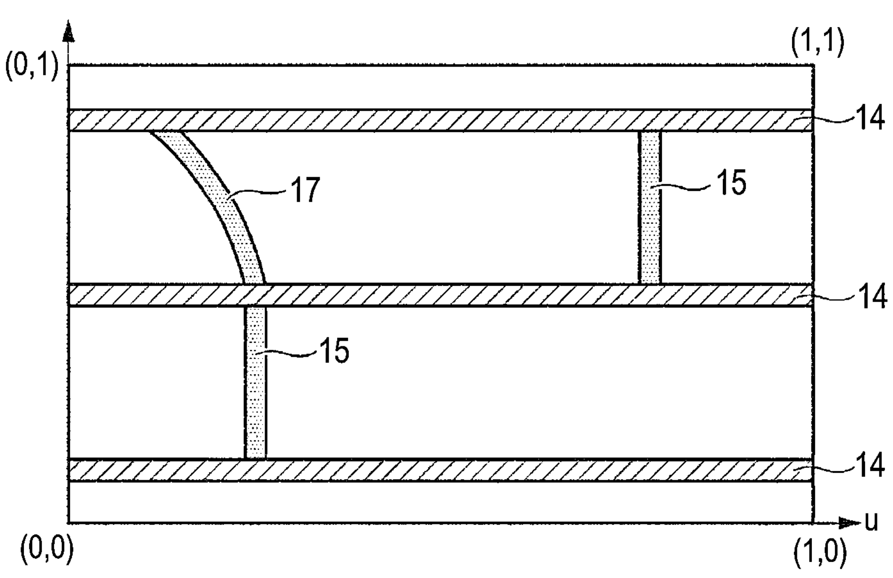
FIG. 2 is a diagram illustrating an example of a field image.

With reference to FIG. 1A, the outline of a game system 1 according to one exemplary embodiment will be described. FIG. 1A is a block diagram of the game system 1 according to this exemplary embodiment. FIG. 2 is a diagram illustrating an example of a field image. The game system 1 includes a server device 10, and one or more terminal devices 20. In FIG. 1A, for convenience, three terminal devices 20 are illustrated, but the number of terminal devices 20 may be two or more.

The server device 10, for example, is an information processing device such as a server managed by a game operator. The terminal device 20, for example, is an information processing device used by a user, such as a mobile phone, a smart phone, a tablet terminal, a personal computer (PC), or a game device. The terminal device 20 is capable of executing an application of a game according to this exemplary embodiment. The application of the game may be received in the terminal device 20 from the server device 10 or a predetermined application distribution server through a network 30, or may be stored in advance in a storage device provided in the terminal device 20 or a storage medium such as a memory card that can be read by the terminal device 20. The server device 10 and the terminal device 20 are connected such that communication is available through the network 30. For example, the server device 10 and the terminal device 20 execute various processing pieces relevant to the game in cooperation.

Note that, the network 30 may include a wireless communication network, the internet, a virtual private network (VPN), a wide area network (WAN), a wired network, or any combination thereof, and the like.

Here, the outline of the game according to this exemplary embodiment will be described. The game according to this exemplary embodiment, for example, is a role-playing game, a simulation game, or the like, and a game medium is used in accordance with the execution of the game. For example, the game according to this exemplary embodiment is a game in which the game medium is moved on a field in a three-dimensional virtual space.

The game medium is electronic data used in the game, and for example, includes any medium such as a card, an item, a point, an in-service currency (or an in-game currency), a ticket, a character, an avatar, and a parameter. In addition, the game medium may be game-related information as level information, status information, game such parameter information (a physical strength value, an offensive strength, and the like), or ability information (a skill, an ability, a spell, a job, and the like). In addition, the game medium is electronic data that can be acquired, possessed, used, managed, exchanged, synthesized, enhanced, sold, discarded, or gifted by the user in the game, but a usage mode of the game medium is not limited to those specified in this specification.

Hereinafter, unless otherwise specified, the "game medium possessed by the user" indicates a game medium associated with a user ID of the user. In addition, "applying the game medium to the user" indicates associating the game medium with the user ID. In addition, "discarding the game medium possessed by the user" indicates deleting the association between the user ID and the game medium. In addition, "consuming the game medium possessed by the user" indicates that some effects or influences can be caused in the game, in accordance with the deletion of the association between the user ID and the game medium. In addition, "selling the game medium possessed by the user" indicates that the association between the user ID and the game medium is deleted and another game medium (for example, a virtual currency, an item, or the like) is associated with the user ID. In addition, "transferring a game medium possessed by a certain user to another user" indicates that an association between a user ID of the certain user and the game medium is deleted and the game medium is associated with a user ID of another user.

The game according to this exemplary embodiment is any game, and as an example, includes a first game part, a second game part, and a third game part.

In the first game part, the user manipulates a user character, and proceeds with the game while exploring the field in the virtual space. Specifically, the user character is moved on the field in accordance with the user manipulation. In the field, for example, various areas such as a town and a dungeon are provided, and for example, various events according to the area, such as a conversation with a resident character of the town and a battle against an enemy character encountered in the dungeon, occur. The event is executed, and thus, the main story of the game proceeds. In addition, in the first game part, for example, in the case of winning the battle with the enemy character, the game medium such as an item, a virtual currency, or a character can be applied to the user.

In the second game part, the user changes the possession situation of the game medium. The user, for example, collects various game media such as an item, a virtual currency, and a character. Specifically, in a case where the user character is moved in a specific area provided on the field, such as a mine and a fishing pond, or the game medium such as a specific character is selected (for example, a touch manipulation with respect to a screen), a sub-event occurs in which the game medium can be acquired. The sub-event, for example, includes the progress of the sub-story, the execution of a mini-game, and the like, but the contents of the sub-event are not limited thereto. Various game media can be applied to the user, in accordance with an execution result of the sub-event.

In the third game part, the user changes parameters relevant to the game medium. The user, for example, reinforces the user character. Specifically, as described above, the game media given to the user in the first game part and the second game part is consumed. Thus, as it is consumed various game parameters of the user character are changed. The game parameter, for example, includes the level, HP, the offensive strength, the defensive strength, the attribute, the skill, and the like of the user character, but is not limited thereto. The user character is reinforced in accordance with a change in the game parameter of the user character. By reinforcing the user character, a probability that the user character is capable of winning the battle with the enemy character in the first game part increases.

As described above, in the game according to this exemplary embodiment, the user repeatedly performs the first game part, the second game part, and the third game part.

(Configuration of Server Device)

The configuration of the server device 10 will be described in detail. The server device 10 includes a server computer. The server device 10 may be attained in cooperation with a plurality of server computers.

The server device 10 includes a server communication unit 11, a server storage unit 12, and a server control unit 13.

The server communication unit 11 includes an interface that communicates with an external device in a wireless or wired manner and transmits and receives information. The server communication unit 11, for example, may include a wireless local area network (LAN) communication module, a wired LAN communication module, or the like. The server communication unit 11 is capable of transmitting and receiving information with respect to the terminal device 20 through a network 30.

The server storage unit 12, for example, is a storage device, and stores various information pieces and programs required for processing the game. For example, the server storage unit 12 stores the application of the game.

In addition, the server storage unit 12 stores various images (texture images) for projecting (texture-mapping) on various objects disposed in the three-dimensional virtual space.

For example, the server storage unit 12 stores an image of the user character. Note that, in this exemplary embodiment, only one user character is expressed in the virtual space, and two or more user characters may be expressed. In addition, the user character used in the virtual space may be suitably exchangeable in users, or may be circulated as a token. In addition, the user character may function as the avatar of the user.

In addition, the server storage unit 12, for example, stores an image according to the game medium, such as a building, a wall, a tree, or a non player character (NPC).

In addition, the server storage unit 12, for example, stores an image of the background (a background image) such as the sky or a distant landscape. Hereinafter, an object on which the background image is projected will also be referred to as a background object. Note that, a plurality of types of background images may be prepared and used differently.

In addition, the server storage unit 12 stores an image of the field (for example, the ground surface) (a field image). The field image is projected onto a field surface described below. Hereinafter, an object in which the field image is projected onto the field surface will also be referred to as a field object. Note that, the field object can be used as a virtual field (the ground surface) in the virtual space.

Here, in the field image, for example, as illustrated in FIG. 2, a texture coordinate system including a u axis and a v axis, which are orthogonal to each other, is set. In this exemplary embodiment, in the field image, a horizontal path 14, a vertical path 15, and a curved road 17 are set. The horizontal path 14, the vertical path 15, and the curved road 17 form a path in the field object in which the user character or the like can be moved. Note that, in FIG. 2, a specific path configuration is illustrated, and the path configuration is any path configuration. In addition, in FIG. 2, the field image is rectangular, and may be in other shapes. In addition, a plurality of types of field images may be prepared and used differently.

The server control unit 13 is a dedicated microprocessor or a CPU attaining a specific function by reading a specific program. For example, the server control unit 13 executes the application of the game, in accordance with the user manipulation with respect to the display unit 23. In addition, the server control unit 13 executes various processing pieces relevant to the game.

For example, the server control unit 13 displays the field image, in which the field object, the user character, or the like is displayed, on the display unit 23. In addition, the server control unit 13 moves the user character on the field object in the virtual space to be relative to the field object, in accordance with a predetermined user manipulation. The details of specific processing of the server control unit 13 will be described below.

Figure 1B:
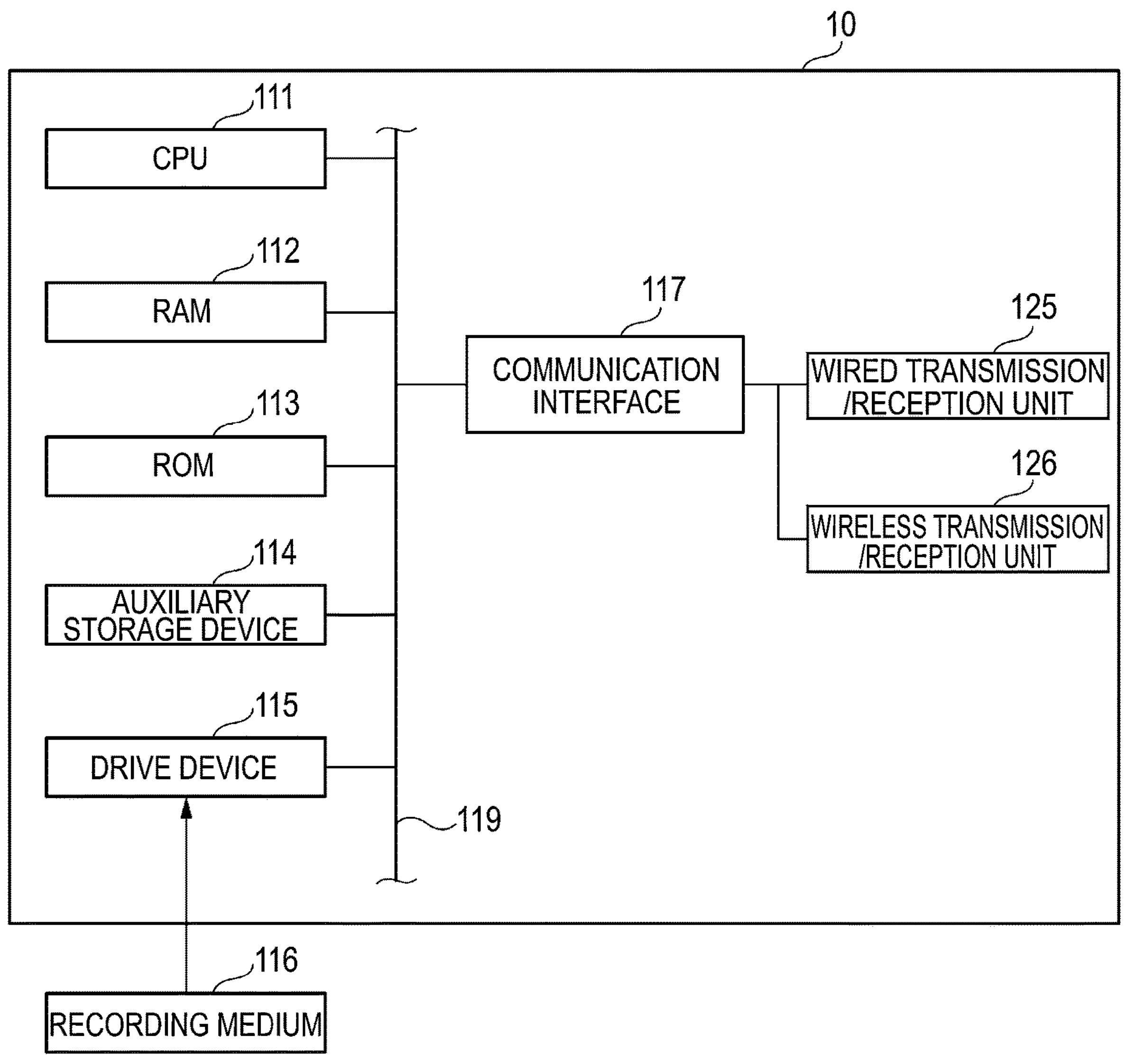
FIG. 1B is a diagram illustrating an example of a hardware configuration of a server device.

FIG. 1B is a diagram illustrating an example of the hardware configuration of the server device 10.

The server device 10 includes a central processing unit (CPU) 111, a random access memory (RAM) 112, a read only memory (ROM) 113, an auxiliary storage device 114, a drive device 115, and a communication interface 117, which are connected by a bus 119, and a wired transmission/reception unit 125 and a wireless transmission/reception unit 126, which are connected to the communication interface 117.

The auxiliary storage device 114, for example, is a hard disk drive (HDD), a solid state drive (SSD), or the like, and is a storage device storing data relevant to application software or the like.

The wired transmission/reception unit 125 includes a transmission/reception unit that is capable of performing communication by using a wired network such as the network 30 (refer to FIG. 1A). Peripheral devices (not illustrated) may be connected to the wired transmission/reception unit 125. However, a part or all of the peripheral devices (not illustrated) may be connected to the bus 119, or may be connected to the wireless transmission/reception unit 126.

The wireless transmission/reception unit 126 is a transmission/reception unit that is capable of performing communication by using a wireless network such as the network 30 (refer to FIG. 1A). The wireless network may include a wireless communication network of a mobile phone, the internet, a virtual private network (VPN), a wide area network (WAN), and the like. In addition, the wireless transmission/reception unit 126 may include a near field communication (NFC) unit, a Bluetooth (Registered Trademark) communication unit, a wireless-fidelity (Wi-Fi) transmission/reception unit, an infrared transmission/reception unit, and the like.

Note that, the server device 10 can be connected to a recording medium 116. The recording medium 116 stores a predetermined program. The program stored in the recording medium 116 is installed in the auxiliary storage device 114 or the like of the server device 10 through the drive device 115. The installed predetermined program can be executed by the CPU 111 of the server device 10. For example, the recording medium 116 may be a recording medium optically, electrically, or magnetically recording information, such as a compact disc (CD)-ROM, a flexible disk, and a magnetooptic disk, a semiconductor memory electrically recording information, such as a ROM and a flash memory, and the like. Note that, a carrier wave is not included in the recording medium 116.

(Configuration of Terminal Device)

The configuration of the terminal device 20 will be described in detail. As illustrated in FIG. 1A, the terminal device 20 includes a terminal communication unit 21, a terminal storage unit 22, a display unit 23, an input unit 24, and a terminal control unit 25.

The terminal communication unit 21 includes an interface that communicates with the external device in a wireless or wired manner and transmits and receives information. The terminal communication unit 21, for example, may include a wireless communication module, a wireless LAN communication module, a wired LAN communication module, or the like, which is compatible with a mobile communication standard such as long term evolution (LTE) (Registered Trademark). The terminal communication unit 21 is capable of transmitting and receiving information with respect to the server device 10 through the network 30.

The terminal storage unit 22, for example, includes a primary storage device and a secondary storage device. For example, the terminal storage unit 22 may include a semiconductor memory, a magnetic memory, an optical memory, or the like. The terminal storage unit 22 stores various information pieces and programs used in the processing of the game, which are received from the server device 10. The information and the program used in the processing of the game may be acquired from the external device through the terminal communication unit 21. For example, an application program of the game may be acquired from a predetermined application distribution server. Hereinafter, the application program will also be simply referred to as an application. In addition, for example, a part or all of the information relevant to the user described above, information relevant to the game medium that is an opponent, and the like may be acquired from the server device 10.

The display unit 23, for example, includes a display device such as a liquid crystal display or an organic electroluminescence (EL) display. The display unit 23 is capable of displaying various images. The display unit 23, for example, includes a touch panel, and functions as an interface detecting various user manipulations. The display unit 23 may be attained by a head mounted display.

The input unit 24, for example, includes an input interface including a touch panel provided integrally with the display unit 23. The input unit 24 is capable of receiving user input with respect to the terminal device 20. In addition, the input unit 24 may include a physical key, or may further include any input interface including a pointing device such as a mouse. In addition, the input unit 24 may include a controller in which an acceleration sensor is built, or the like.

The terminal control unit 25 includes one or more processors. The terminal control unit 25 controls the operation of the entire terminal device 20.

The terminal control unit 25 transmits and receives information through the terminal communication unit 21. For example, the terminal control unit 25 receives various information pieces and programs used in the processing of the game from at least one of the server device 10 and other external servers. The terminal control unit 25 stores the received information and program in the terminal storage unit 22.

The terminal control unit 25 activates the application of the game, in accordance with the manipulation of the user. The terminal control unit 25 executes the game, in cooperation with the server device 10. For example, the terminal control unit 25 displays various images (for example various field images described below) used in the game on the display unit 23. On the screen, for example, a graphic user interface (GUI) detecting the user manipulation may be displayed. The terminal control unit 25 is capable of detecting the user manipulation with respect to the screen through the input unit 24. For example, the terminal control unit 25 is capable of detecting a tap manipulation, a long tap manipulation, a flick manipulation, a swipe manipulation, and the like of the user. The tap manipulation is a manipulation in which the user touches the display unit 23 with a finger, and then, takes away the finger. The terminal control unit 25 transmits manipulation information to the server device 10.

Note that, the hardware configuration of the terminal device 20 may be substantially the same as the hardware configuration of the server device 10 described above, with reference to FIG. 1B. However, the hardware configuration of the terminal device 20 may include a display device corresponding to the display unit 23 with respect to the hardware configuration of the server device 10 described above, with reference to FIG. 1B.

(Drawing Function in Game)

The server control unit 13 may display the field image on the display unit 23 in cooperation with the terminal device 20, and update the field image in accordance with the progress of the game. In this exemplary embodiment, the server control unit 13 draws the object disposed in the three-dimensional virtual space, in an expression seen from the virtual camera disposed in the virtual space, in cooperation with the terminal device 20.

Note that, drawing processing described below is attained by the server control unit 13, and in another exemplary embodiment, a part or all of the drawing processing described below may be attained by the server control unit 13. For example, in the following description, on the basis of data generated by the server device 10, at least a part of the field image displayed on the terminal device 20 may be web display that is displayed on the terminal device 20, and at least a part of the screen may be native display that is displayed by a native application installed in the terminal device 20. In addition, not only the drawing processing but also processing to which other players such as multiplay are not relevant may be attained by the terminal device 20. That is, most processing for attaining the game may be executed on the terminal device 20 side, and the server device 10 may be involved only in the transmission and reception of the other information. In this case, the transmission and reception of the other information, for example, may include the transmission of information required by the progress of the game (a scenario, a character, or the like to be added) from the server device 10, the transmission (storage) of the progress situation of the game to the server device 10, the transmission of information relevant to the other players during the multiplay from the server device 10, the transmission of the own player information to the other players from the server device 10, and the like.

Figure 3:
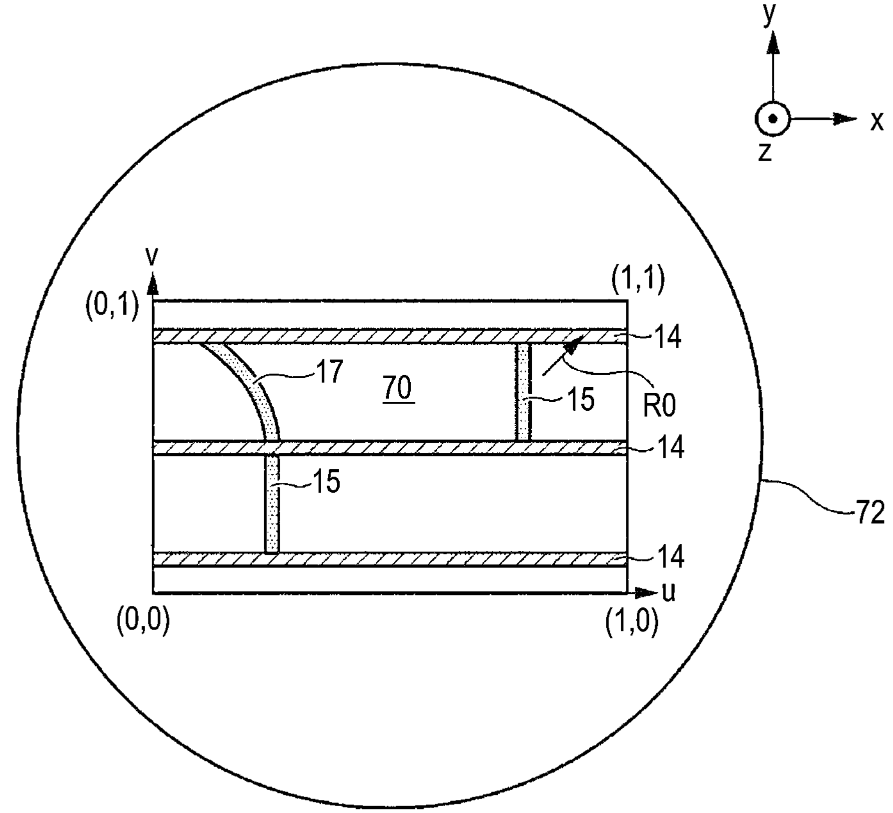
FIG. 3 is a plan view illustrating the entire field surface forming a field object and background surface forming a background object.
Figure 4:
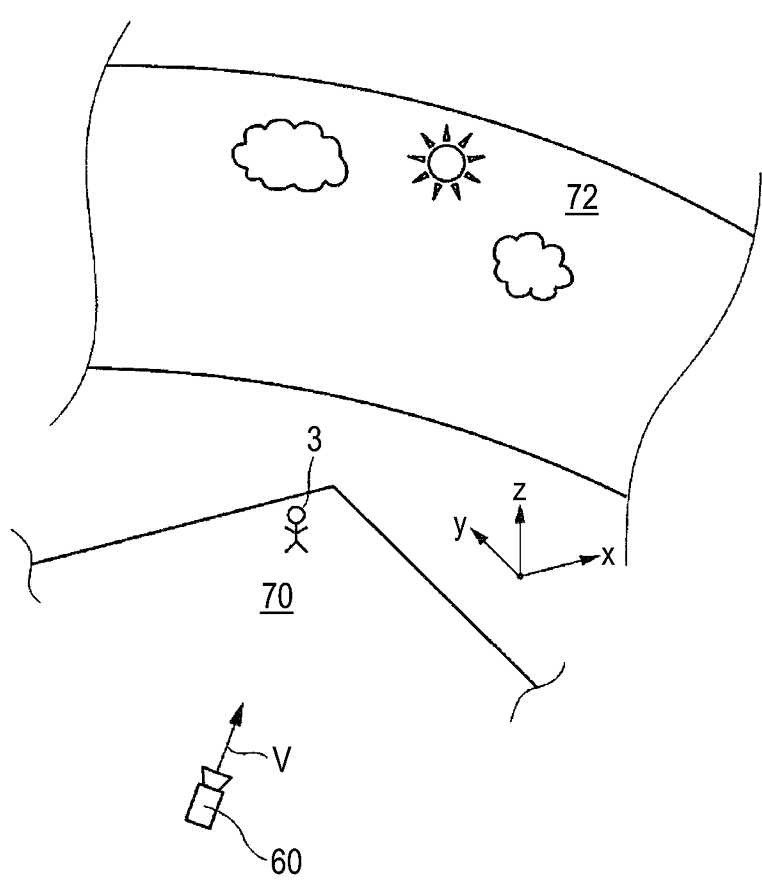
FIG. 4 is a perspective view illustrating a part of the field surface and the background surface when seen in an oblique direction including a directional component of an arrow R0 in FIG. 3.

FIG. 3 and FIG. 4 are explanatory diagrams of the visual field of a virtual camera 60, and illustrate an example of the field object and the background object. FIG. 3 is a plan view illustrating all of a field surface 70 forming the field object and a background surface 72 forming the background object, and FIG. 4 is a perspective view illustrating a part of the field surface 70 and the background surface 72 when seen in an oblique direction including a directional component of an arrow R0 in FIG. 3. In FIG. 4, a user character 3 and the virtual camera 60 are also schematically illustrated. In addition, in FIG. 4, the background surface 72 is illustrated in the form of the background object on which the background image including the figure of clouds or the sun is projected.

In the following description, the movement of various objects represents a movement in the virtual space. In addition, the visible range of various objects represents the visual field of the virtual camera 60 (that is, a range in an angle 62 of field of the virtual camera 60).

In FIG. 3, as a space coordinate system of the virtual space, an x, y, and z coordinate system (hereinafter, also referred to as a "global coordinate system") are illustrated. Note that, the starting point of the global coordinate system may be fixed to any position. Hereinafter, a z direction corresponds to a height direction, and in the z direction, a positive side is set to the upper side of the virtual space, and a negative side is set to the lower side of the virtual space. Hereinafter, the terms of an x direction, a y direction, and a z direction indicate a direction parallel to an x axis, a direction parallel to a y axis, and a direction parallel to a z axis, respectively. For example, the z direction represents a direction parallel to the z axis passing through any point in an xy-flat surface, unless otherwise stated.

The field surface 70 is disposed in association with the xy-flat surface in the virtual space. In this exemplary embodiment, as an example, the field surface 70 is disposed in association with the xy-flat surface such that the u axis, the v axis, and the starting point of the texture coordinate system of the projected field image are coincident with the x axis, the y axis, and the starting point of the global coordinate system. Note that, in FIG. 3, as a state before association, the u axis, the v axis, and the starting point of the texture coordinate system are illustrated separately from the x axis, the y axis, and the starting point of the global coordinate system. The field surface 70 is not capable of being translationally moved (linearly moved) in each of the directions of the x direction, the y direction, and the z direction. However, in another exemplary embodiment, the field surface 70 may be capable of being translationally moved in the global coordinate system.

Note that, the field surface 70 extends to intersect with the z direction. Note that, "intersecting" also includes a concept other than being orthogonal. When a flat surface parallel to the xy-flat surface is set to a normal state, deformation may be performed from the normal state. In addition, the field surface 70 may include various change portions with respect to the flat surface parallel to the xy-flat surface, such as irregularities or an inclined surface. In addition, the field surface 70 may include a curved surface.

Note that, in a case where the field image is projected, in the normal state, the field surface 70 is capable of taking over the texture coordinates of the projected field image. That is, each position on the field surface 70 on which the field image is projected can be substantially specified by the texture coordinate system of the field image (refer to FIG. 2).

Hereinafter, the coordinate system for specifying each position on the field surface 70 is coincident with the texture coordinate system of the field image projected on the field surface 70, and is also referred to as a "field coordinate system".

The background surface 72 extends in the z direction of the background object. However, in another exemplary embodiment, the background surface 72 may be disposed to be inclined with respect to the z direction. In FIG. 3, the background surface 72 is disposed to surround the field surface 70. In this case, the background surface 72 may be fixed to the global coordinate system, or may be moved only in the z direction. However, in another exemplary embodiment, the background surface 72 may be disposed to surround only a part of the field surface 70. In this case, the background surface 72 may be rotatively moved in accordance with the rotation of the virtual camera 60. In addition, in another exemplary embodiment, the background surface 72 may be deformable, as with the field surface 70.

Figure 5:
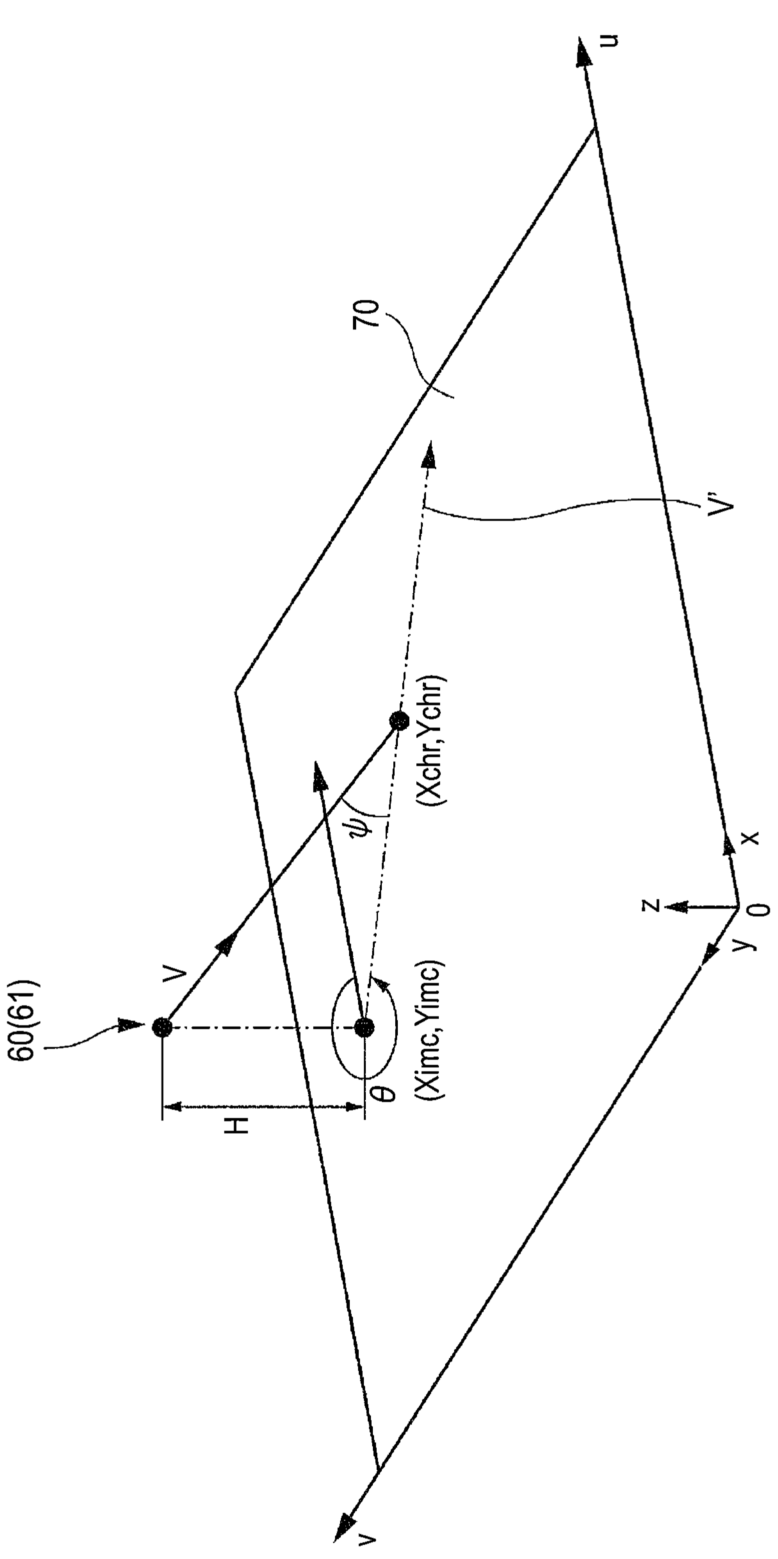
FIG. 5 is an explanatory diagram of camera parameters of a virtual camera.

FIG. 5 is an explanatory diagram of the camera parameters of the virtual camera 60. In FIG. 5, the field surface 70 positioned in the global coordinate system is illustrated. Note that, hereinafter, for description, the starting point of the field coordinate system is the same as the starting point of the global coordinate system, and the u axis of the field coordinate system (=the u axis of the texture coordinate system) is coincident with the x axis of the global coordinate system, and the v axis of the field coordinate system (=the v axis of the texture coordinate system) is coincident with the y axis of the global coordinate system. Note that, hereinafter, the field surface 70 represents the field surface 70 in a state where the field image is projected (the field surface 70 of the field object), unless otherwise stated.

In this exemplary embodiment, as an example, the camera parameters include two position parameters (Ximc, Yimc), a height parameter H, a direction parameter θ, and an angle of attack parameter ψ. In a case where the values of all of the parameters are set, the virtual camera 60 can be uniquely positioned with respect to the global coordinate system (and thus, the field coordinate system). Note that, the camera parameters may be set in the field coordinate system.

The position parameter Ximc is an x coordinate of the virtual camera 60, and is an x coordinate of an intersection point between a straight line extending in the z direction from the reference position of the virtual camera 60 (for example, a camera center position) and the xy-flat surface. The position parameter Yimc is a y coordinate of the virtual camera 60, and is a y coordinate of the intersection point between the straight line extending in the z direction from the reference position of the virtual camera 60 and the xy-flat surface. The direction parameter θ is an angle between a projected vector V' in a visual line direction V on the xy-flat surface and the x axis. The angle of attack parameter ψ is an angle between the visual line direction V and the xy-flat surface.

Note that, a method for setting the camera parameters is not limited thereto, and the camera parameters can be set in various modes. That is, such camera parameters are for the following description, and in the actual processing, different parameters may be equivalently used. In addition, the freedom degree of the virtual camera 60 may be any combination of the translation on each of three axes and the rotation around three axes.

Figures 6, 7:
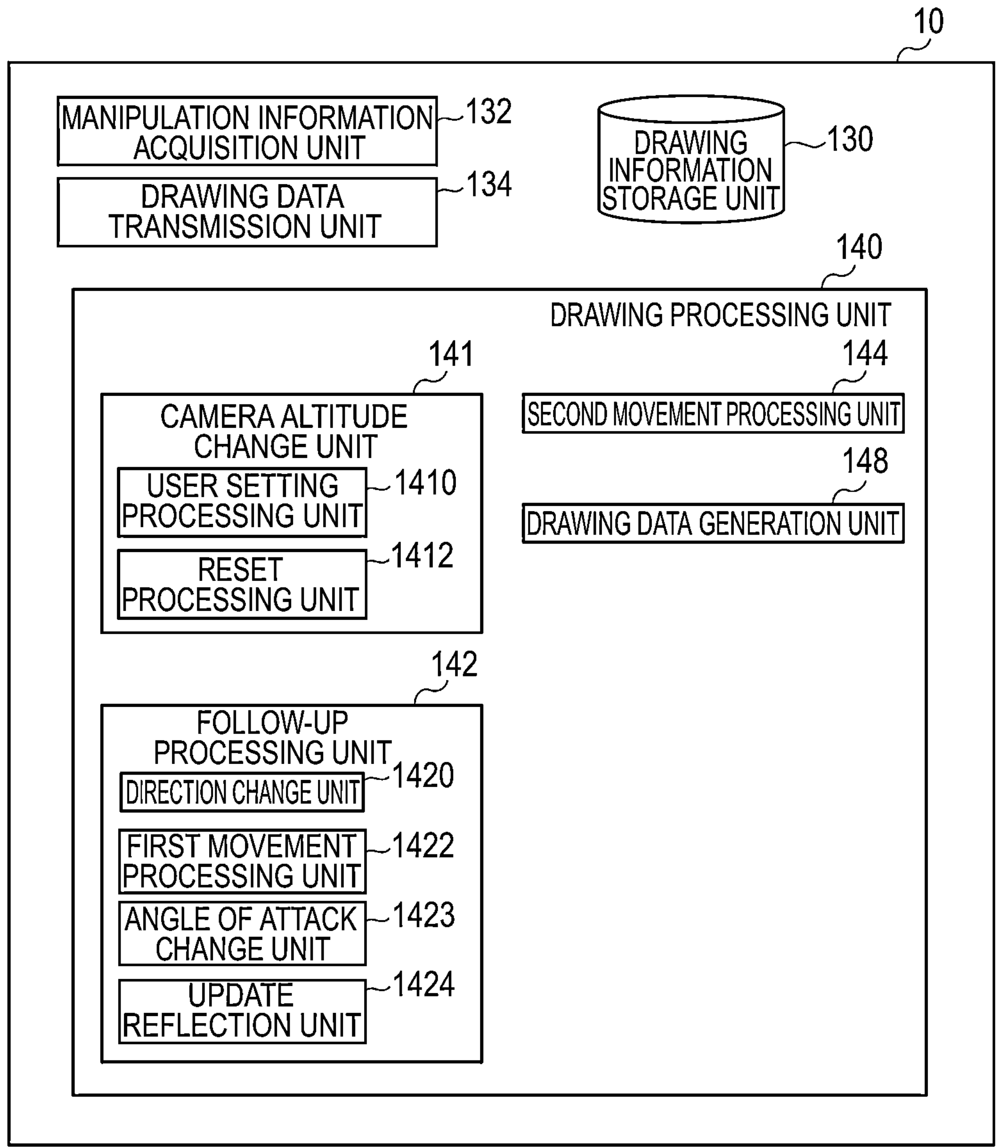
FIG. 6 is an example of a functional block diagram relevant to a drawing function of the server device.
FIG. 7 is an image diagram of a map representing each setting value of follow-up degree parameters in association with each value of height parameters.
Figure 8:
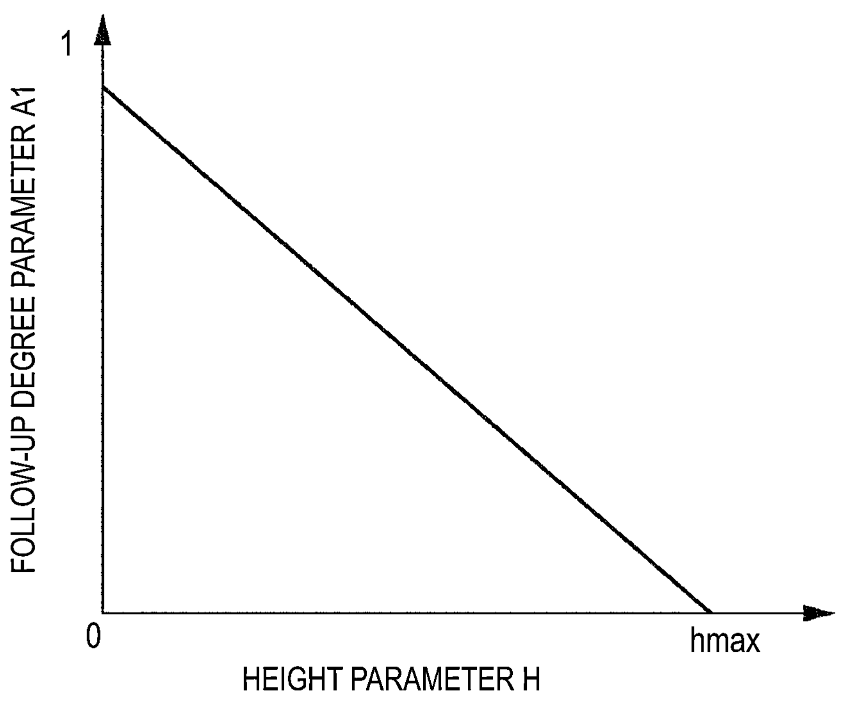
FIG. 8 is an explanatory diagram illustrating an example of a relationship between the height parameters and the follow-up degree parameters.

FIG. 6 is an example of a functional block diagram relevant to a drawing function of the server device 10. FIG. 7 is an image diagram of a map representing each setting value of a follow-up degree parameter A1 in association with each value of the height parameter H. FIG. 8 is an explanatory diagram illustrating an example of a relationship between the height parameter H and the follow-up degree parameter A1.

As illustrated in FIG. 6, the server device 10 includes a drawing information storage unit 130, a manipulation information acquisition unit 132, a drawing data transmission unit 134, and a drawing processing unit 140. Note that, the drawing information storage unit 130 can be attained by the server storage unit 12 illustrated in FIG. 1A, the manipulation information acquisition unit 132 and the drawing data transmission unit 134 can be attained by the server communication unit 11 illustrated in FIG. 1A, and the drawing processing unit 140 can be attained by the server control unit 13 illustrated in FIG. 1A. Hereinafter, regarding the processing of each unit, "calculating" is a concept including processing of only reading out a calculated value, a setting value, or the like stored as data.

Note that, the drawing information storage unit 130 can be attained by the server storage unit 12 illustrated in FIG. 1A (for example, the auxiliary storage device 114 illustrated in FIG. 1B, or the like). In addition, various processing units such as the manipulation information acquisition unit 132 can be attained by the server control unit 13 and the server communication unit 11 illustrated in FIG. 1A. Specifically, various processing units such as the manipulation information acquisition unit 132 can be attained by the CPU 111 illustrated in FIG. 1B executing one or more programs stored in the storage device (for example, the ROM 113 or the like) illustrated in FIG. 1B.

The drawing g information storage unit 130 stores various information pieces and data pieces, which are used by the drawing processing unit 140.

In this exemplary embodiment, in the drawing information storage unit 130, each setting value of the follow-up degree parameter A1 used when executing object follow-up processing described below is stored. In this exemplary embodiment, each setting value of the follow-up degree parameter A1 represents a follow-up degree according to the rotation of the virtual camera 60.

In this exemplary embodiment, each setting value of the follow-up degree parameter A1 is changed in accordance with the value of the height parameter H. In the example illustrated in FIG. 7, each setting value of the follow-up degree parameter A1 is defined in association with each value of the height parameter H. Note that, in FIG. 7, each value of the height parameter H is changed by "5", and a change amount (resolution capability) is any change amount.

In this exemplary embodiment, as an example, the value of the follow-up degree parameter A1 is a relative value when 100% follow-up is set to "1". Accordingly, there is a relationship in which the follow-up degree increases as the value of the follow-up degree parameter A1 becomes closer to 1. Note that, the follow-up degree parameter A1 represents the follow-up degree relevant to the rotation, and thus, has a conflicting relationship with a follow-up degree relevant to a movement (described below).

In this exemplary embodiment, the value of the follow-up degree parameter A1 increases as the value of the height parameter H decreases (becomes closer to 0). Note that, a change range of the value of the height parameter H is any change range, and in this exemplary embodiment, as an example, the lower limit value is set to "0". The value of the height parameter H=0 represents the top of the field surface 70. That is, the value of the height parameter H represents a relative height with respect to the field surface 70. Note that, as described above, the field surface 70 may include irregularities or the like, and in this case, the value of the height parameter H may represent a height considering the irregularities, or may represent a height ignoring the irregularities.

Note that, the value of the follow-up degree parameter A1 according to the value of the height parameter H may be calculated by using a function or the like. For example, in FIG. 8, a function representing a relationship between the value of the height parameter H and the value of the follow-up degree parameter A1 is schematically illustrated. In this case, the relationship between the value of the height parameter H and the value of the follow-up degree parameter A1 is a proportionate relationship. However, the relationship may be a non-linear relationship insofar as the value of the follow-up degree parameter A1 increases to 1 as the value of the height parameter H decreases (becomes closer to 0). Note that, in the example illustrated in FIG. 8, a value hmax of the height parameter H corresponds to the maximum value (the upper limit value) in a variable range of the value of the height parameter H. However, in another exemplary embodiment, the maximum value in the variable range of the value of the height parameter H may be greater than the value hmax. Note that, in this case, in a case where the value of the height parameter H is greater than the value hmax, the value of the follow-up degree parameter A1 remains 0 and is not changed.

The manipulation information acquisition unit 132 acquires the manipulation information of the user. Note that, the manipulation information of the user is generated in accordance with various manipulations of the user in the terminal device 20. Note that, the manipulation information may be generated by touch input on the touch panel, various manipulations (for example, a manipulation of activating the controller built in the acceleration sensor, and the like) of the user in the state of being mounted with a head mounted display, gesture or voice input, and the like. In this exemplary embodiment, the manipulation information includes a movement instruction of a predetermined object and a height instruction of the virtual camera 60. The movement instruction of the predetermined object is an instruction for changing the position of the predetermined object with respect to the field object (hereinafter, also simply referred to as the "position of the predetermined object"), and may include an instruction such as a movement direction or a movement amount. The height instruction of the virtual camera 60 is an instruction for changing the value of the height parameter H of the virtual camera 60 described above. The value of the height parameter H of the virtual camera 60 may be changed linearly or non-linearly within a predetermined range. The predetermined object is any object, and in this exemplary embodiment, is preferably the user character.

The drawing data transmission unit 134 transmits drawing data for a field image generated by the drawing processing unit 140 to the terminal device 20. Note that, as described above, in another exemplary embodiment, a part or all of the drawing processing of the drawing processing unit 140 may be attained on the terminal device 20 side. For example, in a case where the drawing processing unit 140 is attained by the terminal device 20, the drawing data transmission unit 134 may be omitted.

The drawing processing unit 140 generates the drawing data for a field image, on the basis of various data pieces in the drawing information storage unit 130, the manipulation information from the terminal device 20, and the like.

The drawing processing unit 140 includes a camera altitude change unit 141, a follow-up processing unit 142, a second movement processing unit 144, and a drawing data generation unit 148.

The camera altitude change unit 141 includes a user setting processing unit 1410 (an example of a camera height setting unit) and a reset processing unit 1412.

The user setting processing unit 1410 is operated in a situation where the reset processing unit 1412 is not operated. The user setting processing unit 1410 changes the value of the height parameter H of the virtual camera 60, in accordance with the height instruction from the user. Note that, the height instruction from the user may include an instruction of directly designating a z coordinate, an instruction of increasing and decreasing the previous value, and the like. The user setting processing unit 1410 sets the current value that is the same as the previous value, in a processing period where there is no height instruction from the user.

The reset processing unit 1412 is operated in a predetermined situation, and performs reset processing of resetting the value of the height parameter H of the virtual camera 60 to the initial value or a predetermined value. The predetermined situation is any situation, and when the value of the height parameter H of the virtual camera 60 is the initial value or the predetermined value, the predetermined situation may be a situation where the visibility (for example, visibility with respect to an item on the field object, and the like) of the user is excellent, a situation where visually induced motion sickness is reduced, and the like.

For example, in a case where one scene is switched to the other scene by scene switching (transition), the height of the virtual camera 60 may be set in advance with respect to the other scene. In this case, the reset processing may be executed on the height of the virtual camera 60 to a value set in advance (a predetermined value). The scene switching (transition) may include a movement to the field of district (a town) from the field of forest, and the like. In addition, when a predetermined event occurs such as the occurrence of a conversation event and the occurrence of a battle event, the reset processing may be executed. In this case, the height of the virtual camera 60 is forcibly reset to a height suitable for the event or the field object, and thus, it is possible to reduce a possibility that the visibility of the event or the field object is impaired. In addition, in this case, the height of the virtual camera 60 may be returned again to the original value. For example, in a case where the reset processing is executed when the predetermined event occurs, and the predetermined event is ended, the height of the virtual camera 60 may be returned to the original value. In addition, in a case where the reset processing is executed when the predetermined object is moved into a predetermined area, and the predetermined object is moved out of the predetermined area, the height of the virtual camera 60 may be returned to the original value.

In a case where the predetermined object is moved in the virtual space, the follow-up processing unit 142 executes object follow-up processing of allowing the virtual camera to follow up the predetermined object.

In this exemplary embodiment, as an example, the follow-up processing unit 142 performs update processing (calculation processing) of each value of the camera parameters (X, Y, θ, and ψ) of the virtual camera 60 for each predetermined period (for example, for each frame period) to attain the object follow-up processing. Hereinafter, regarding the value of the parameter, the "previous value" indicates a value calculated in the previous processing period on the basis of a time when the execution of the current processing period, and the "current value" indicates a value calculated when the current processing period is executed.

The follow-up processing unit 142 includes a direction change unit 1420, a first movement processing unit 1422, an angle of attack change unit 1423, and an update reflection unit 1424.

The direction change unit 1420 updates (changes) the value of the direction parameter θ of the virtual camera 60.

In this exemplary embodiment, the direction change unit 1420 calculates the current value of the direction parameter θ of the virtual camera 60, on the basis of each previous value of the position parameters (Ximc, Yimc) of the virtual camera 60, each current value of position parameters (Xchr, Ychr) of the predetermined object (refer to FIG. 5), and the current value of the height parameter H.

Figure 9:
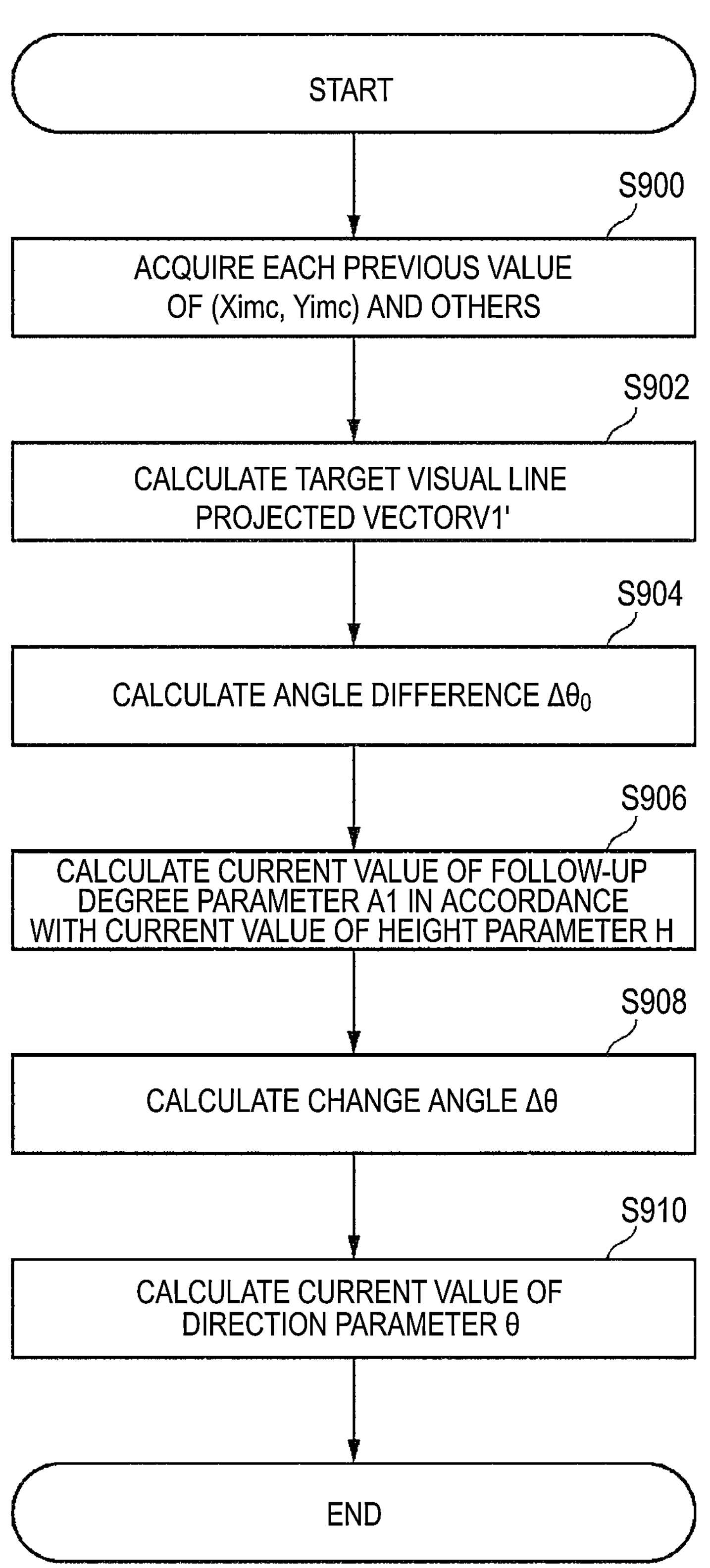
FIG. 9 is a schematic flowchart illustrating a flow of an example of processing executed by a direction change unit.

FIG. 9 is a schematic flowchart illustrating the flow of an example of processing executed by the direction change unit 1420.

In step S900, the direction change unit 1420 acquires each previous value of the position parameters (Ximc, Yimc) of the virtual camera 60, each current value of the position parameters (Xchr, Ychr) of the predetermined object, and the current value of the height parameter H. The current value of the height parameter H is as described above in relation to the camera altitude change unit 141. A method for calculating each current value of the position parameters (Xchr, Ychr) of the predetermined object will be described below in relation to the second movement processing unit 144.

In step S902, the direction change unit 1420 calculates a target visual line projected vector V1', on the basis of the each previous value of the position parameters (Ximc, Yimc) of the virtual camera 60 and each current value of the position parameters (Xchr, Ychr) of the predetermined object. The target visual line projected vector V1' may be calculated as the projected vector V' in the visual line direction V of the virtual camera 60 on the xy-flat surface when directed toward the predetermined object from the position of the current virtual camera 60. Specifically, the target visual line projected vector V1' may be calculated as (Xchr-Ximc, Ychr-Yimc).

In step S904, the direction change unit 1420 calculates an angle difference $\Delta\theta_0$ between the projected vector V' and the target visual line projected vector V1', on the basis of the projected vector V' (the current value) of the current virtual camera 60 and the target visual line projected vector V1' calculated in step S902. The angle difference $\Delta\theta_0$ is an angle between two vectors, and can be calculated by an inner product or the like. Note that, here, for description, the angle difference $\Delta\theta_0$ is calculated by setting a counterclockwise direction as the positive side when seen from the positive side in the z direction as illustrated in FIG. 5.

In step S906, the direction change unit 1420 calculates the current value of the follow-up degree parameter A1 according to the current value, on the basis of the current value of the height parameter H. The current value of the follow-up degree parameter A1 may be calculated by the method described above with reference to FIG. 7 and FIG. 8.

In step S908, the direction change unit 1420 calculates a change angle Δθ in the current period according to the direction parameter θ of the virtual camera 60, which is changed in the current processing period, on the basis of the angle difference $\Delta\theta_0$ obtained in step S904 and the current value of the follow-up degree parameter A1 calculated in step S906. In this exemplary embodiment, the change angle Δθ in the current period is calculated by multiplying the current value of the angle difference $\Delta\theta_0$ by the current value of the follow-up degree parameter A1. That is, the change angle Δθ in the current period is Current Value of Angle Difference $\Delta\theta_0$×Current Value of Follow-Up Degree Parameter A1.

In step S910, the direction change unit 1420 calculates the current value of the direction parameter e, on the basis of the previous value of the direction parameter θ and the change angle Δθ in the current period calculated in step S908. The current value of the direction parameter θ is calculated by adding the change angle Δθ in the current period to the previous value of the direction parameter θ. That is, the current value of the direction parameter θ is Previous Value of Direction Parameter 0+Change Angle Δθ in Current Period.

As described above, in this exemplary embodiment, the angle difference $\Delta\theta_0$ obtained in step S904 is not directly reflected on the current value of the direction parameter θ, but a calculation mode of the current value of the direction parameter θ is changed in accordance with the value of the follow-up degree parameter A1. That is, the current value of the direction parameter θ is calculated in a mode changed in accordance with the current value of the height parameter H. Accordingly, a follow-up mode of the virtual camera 60 in the visual line direction can be changed in accordance with the current value of the height parameter H.

More specifically, the value of the follow-up degree parameter A1 is a value within a range of 0 or more and 1 or less, as described above. In a case where the value of the follow-up degree parameter A1 is within the range of 0 or more and 1 or less, an available range of the change angle Δθ in the current period is 0≤Change Angle Δθ in Current Period≤Current Value of Angle Difference $\Delta\theta_0$. In addition, in this exemplary embodiment, as described above, there is a relationship in which the value of the follow-up degree parameter A1 increases toward 1 as the value of the height parameter H decreases toward 0. Accordingly, according to this exemplary embodiment, as the value of the height parameter H decreases (that is, as the height of the virtual camera 60 decreases), it is possible to increase the follow-up degree according to the rotation of the virtual camera 60 with respect to the movement of the predetermined object. In other words, as the value of the height parameter H increases (that is, the height of the virtual camera 60 increases), it is possible to decrease the follow-up degree according to the rotation of the virtual camera 60 with respect to the movement of the predetermined object.

The first movement processing unit 1422 updates each value of the position parameters (Ximc, Yimc) of the virtual camera 60, in cooperation with the direction change unit 1420.

In this exemplary embodiment, the first movement processing unit 1422 calculates each current value of the position parameters (Ximc, Yimc) of the virtual camera 60, on the basis of each previous value of the position parameters (Ximc, Yimc) of the virtual camera 60, each previous value and each current value of the position parameters (Xchr, Ychr) (refer to FIG. 5) of the predetermined object, and the current value of the direction parameter θ.

Figure 10:
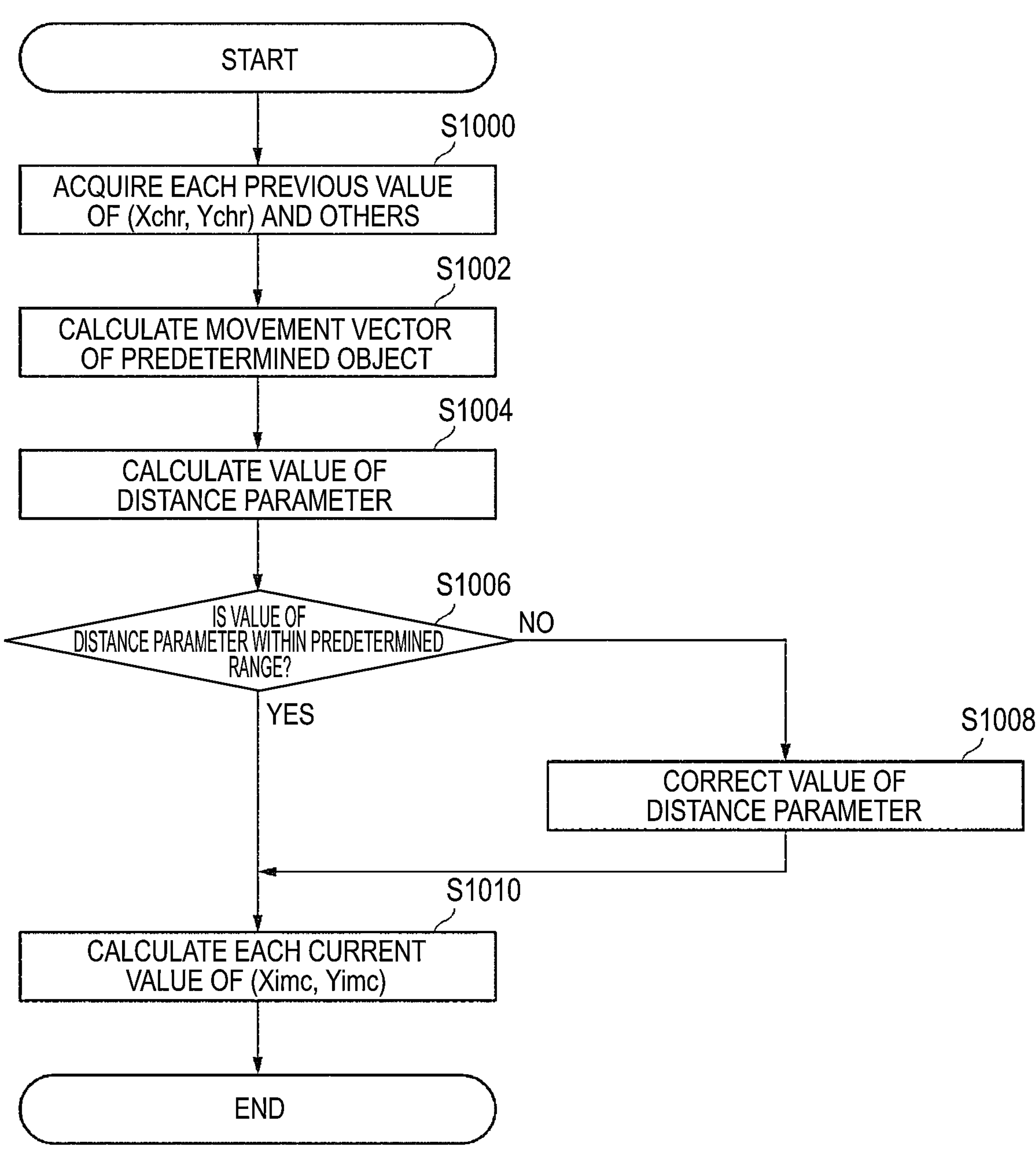
FIG. 10 is a schematic flowchart illustrating a flow of an example of processing executed by a first movement processing unit.

FIG. 10 is a schematic flowchart illustrating the flow of an example of processing executed by the first movement processing unit 1422.

In step S1000, the first movement processing unit 1422 acquires each previous value and each current value of the position parameters (Xchr, Ychr) of the predetermined object, each previous value of the position parameters (Ximc, Yimc) of the virtual camera 60, and the current value of the direction parameter e.

In step S1002, the first movement processing unit 1422 calculates a movement vector of the predetermined object, on the basis of each previous value and each current value of the position parameters (Xchr, Ychr) of the predetermined object.

In step S1004, the first movement processing unit 1422 calculates the value of a distance parameter, on the basis of each previous value of the position parameters (Ximc, Yimc) of the virtual camera 60, the current value of the direction parameter θ, and the movement vector of the predetermined object obtained in step S1002. The distance parameter represents a distance from each previous value of the position parameters (Ximc, Yimc) of the virtual camera 60 onto the movement vector (a distance in the xy-flat surface), along the direction of the current value of the direction parameter e.

In step S1006, the first movement processing unit 1422 determines whether the value of the distance parameter calculated in step S1004 is within a predetermined range. The predetermined range is defined by predetermined lower limit value and upper limit value. The predetermined range may be fixed, or may be changeable by the user. In a case where the determination result is "YES", the process proceeds to step S1010, and in the other case, the process proceeds to step S1010 through step S1008.

In step S1008, the first movement processing unit 1422 corrects the value of the distance parameter to the lower limit value or the upper limit value. For example, in a case where the value of the distance parameter calculated in step S1004 is greater than the upper limit value of the predetermined range, the first movement processing unit 1422 allows the value of the distance parameter to be coincident with the upper limit value. In addition, in a case where the value of the distance parameter calculated in step S1004 is less than the lower limit value of the predetermined range, the first movement processing unit 1422 allows the value of the distance parameter to be coincident with the lower limit value.

In step S1010, the first movement processing unit 1422 calculates each current value of the position parameters (Ximc, Yimc) of the virtual camera 60, on the basis of the current value of the direction parameter θ, and the value of the distance parameter (a calculated value in step S1004 or a value after correction in step S1008). That is, the first movement processing unit 1422 calculates each current value of the position parameters (Ximc, Yimc) of the virtual camera 60, which establishes the direction of the current value of the direction parameter θ and the value of the distance parameter. Specifically, the first movement processing unit 1422 calculates a position offset from each current value of the position parameters (Ychr) of the predetermined object by the value of the distance parameter, along the direction of the current value of the direction parameter θ, as each current value of the position parameters (Ximc, Yimc) of the virtual camera 60.

As described above, according to the processing illustrated in FIG. 10, in a mode where a distance between each current value of the position parameters (Ximc, Yimc) of the virtual camera 60 and the current value of the position parameters (Xchr, Ychr) of the predetermined object falls within a predetermined range, each current value of the position parameters (Ximc, Yimc) of the virtual camera 60 can be calculated.

Note that, in the processing illustrated in FIG. 10, in a mode where a projection distance in the xy-flat surface between the predetermined object and the virtual camera 60 falls within a predetermined range, each current value of the position parameters (Ximc, Yimc) of the virtual camera 60 is calculated. However, in a mode where a space distance between the predetermined object and the virtual camera 60 falls within a predetermined range, each current value of the position parameters (Ximc, Yimc) of the virtual camera 60 may be calculated.

The angle of attack change unit 1423 calculates the current value of the angle of attack parameter ψ, on the basis of each current value of the position parameters (Ximc, Yimc) of the virtual camera 60, the current value of the height parameter H, and the current value of the position parameters (Xchr, Ychr) of the predetermined object. The angle of attack change unit 1423 calculates the current value of the angle of attack parameter ψ such that the visual line direction of the virtual camera 60 passes through the current value of the position parameters (Xchr, Ychr) of the predetermined object.

The update reflection unit 1424 positions the virtual camera 60 with respect to the global coordinate system or the field coordinate system, on the basis of each current value of the position parameters (Ximc, Yimc) of the virtual camera 60, the current value of the direction parameter e, the current value of the height parameter H, and the current value of the angle of attack parameter ψ. Accordingly, the virtual camera 60 is positioned with respect to the field surface 70 (and thus, the field object).

In a case where a predetermined movement condition is established, the second movement processing unit 144 updates the position of the predetermined object with respect to the field object. Note that, the predetermined object is any object insofar as the predetermined object is an object of which the position with respect to the field object can be changed, and is preferably the user character as described above. The predetermined movement condition is any movement condition, and for example, may be satisfied by the manipulation information (the movement instruction of the predetermined object) acquired by the manipulation information acquisition unit 132, or may be satisfied by the progress situation of the game or other factors (for example, a factor of causing an automatic movement instruction by a computer). Note that, the position of the predetermined object, for example, may be defined by the texture coordinate system of the field image.

For example, in a case where the manipulation information acquired by the manipulation information acquisition unit 132 is the movement instruction of the predetermined object, the second movement processing unit 144 updates the position of the predetermined object in accordance with the movement instruction. Note that, as described above, the movement instruction can be input by the touch input on the touch panel, the input in the state of being mounted with the head mounted display, and the like.

The drawing data generation unit 148 generates the field image (the drawing data) including the expression of various objects (including the user character) seen from the virtual camera 60.

According to this exemplary embodiment, an execution mode (the follow-up degree) of the object follow-up processing can be changed in accordance with the height of the virtual camera 60. Specifically, in a mode where the follow-up degree relevant to the rotation (the direction) of the virtual camera 60 with respect to the movement of the predetermined object decreases as the height of the virtual camera 60 increases, the object follow-up processing can be attained. In other words, in a mode where the follow-up degree relevant to the movement (the parallel movement) of the virtual camera 60 with respect to the movement of the predetermined object increases as the height of the virtual camera 60 decreases, the object follow-up processing can be attained. Accordingly, when the height of the virtual camera 60 is comparatively high, it is possible to effectively reduce a problem (the degradation of manipulativeness, the visually induced motion sickness, and the like) that easily occurs in a case where the follow-up degree relevant to the rotation (the direction) of the virtual camera 60 is comparatively high.

In addition, in a mode where the follow-up degree relevant to the rotation (the direction) of the virtual camera 60 with respect to the movement of the predetermined object increases as the height of the virtual camera 60 decreases, the object follow-up processing can be attained. In other words, in a mode where the follow-up degree relevant to the movement (the parallel movement) of the virtual camera 60 with respect to the movement of the predetermined object decreases as the height of the virtual camera 60 decreases, the object follow-up processing can be attained. Accordingly, in a case where the height of the virtual camera 60 is comparatively low, the view (the viewpoint in a progress direction) of the virtual camera 60 from behind the predetermined object is likely to continue with respect to the movement of the predetermined object. Accordingly, various information pieces (for example, distant information) in front of the predetermined object in the progress direction can be ensured within the visual field.

However, the optimal solution of the movement or the visual field of the virtual camera 60 can be changed in accordance with the request of the user, the environment of the device or the like to be used, the scene in the game, and the like. Accordingly, it is desirable that the movement or the visual field of the virtual camera 60 can be flexibly set. On the other hand, it is troublesome for the user to minutely set a change mode of the value of each camera parameter of the virtual camera 60. In this respect, according to this exemplary embodiment, as described above, in accordance with the height of the virtual camera 60 that can be set by the user, an execution mode (the follow-up degree) of the object follow-up processing can be automatically changed. In other words, the user changes the setting of the height of the virtual camera 60, and thus, the execution mode (the follow-up degree) of the object follow-up processing can be automatically changed. In this case, the follow-up degree is set in advance in accordance with the height of the virtual camera 60 to be approximately optimal for the height. Accordingly, a setting burden on the user is also reduced. However, in this exemplary embodiment, the value of the follow-up degree parameter A1 is uniquely set in advance in accordance with the height of the virtual camera 60, and a relationship between the value of the follow-up degree parameter A1 and the height of the virtual camera 60 may be adjustable by the user.

In addition, it is desirable that the follow-up mode of the virtual camera 60 with respect to the movement of the predetermined object is attained in a mode where the visibility is not impaired and the visually induced motion sickness is less likely to occur. In particular, in the environment using the touch panel, a region used for manipulation is required, and it is important to ensure a visual field that is more limited than a visual field (an image in the screen) in which a region that can be actually used as the visual field is displayed, and thus, a more optimal visual field. There is a concern that a radical change in the visual field decreases the visibility of the user.

In contrast, according to this exemplary embodiment, by changing the follow-up degree while flexibly changing the height of the virtual camera, it is possible to ensure the optimal visual field according to the situation. In particular, in the environment using the touch panel, it is possible to ensure the visual field optimal for the limited region, and thus, compatibility is more excellent.

In addition, in an environment where the user is mounted with the head mounted display, 3D sickness is more likely to occur, and thus, a radical change in the visual field may accelerate the 3D sickness. According to this exemplary embodiment, the follow-up degree is changed in accordance with a change in the height of the virtual camera, and thus, it is possible to suppress the rotation of the visual field (a change in the direction of the virtual camera 60) to the optimal frequency while suitably ensuring the visual field. Accordingly, compatibility with the virtual space drawn on the head mounted display, which more easily causes sickness (the 3D sickness) than a virtual space drawn on a normal display, is excellent.

Further, according to this exemplary embodiment, the value of the follow-up degree parameter A1 is only gradually changed in a constant direction, in accordance with a change in the height of the virtual camera 60 in the constant direction. Accordingly, according this exemplary embodiment, it is possible to effectively reduce a problem that the value of the follow-up degree parameter A1 is changed in two directions in accordance with a change in the height of the virtual camera 60 in the constant direction, or the value of the follow-up degree parameter A1 is radically changed in accordance with a change in the height of the virtual camera 60 in the constant direction. That is, this exemplary embodiment is suitable in a case where the display unit 23 and the input unit 24 are the touch panel or the head mounted display.

Note that, in the exemplary embodiment described above, three or more different values are available as the setting value of the follow-up degree parameter A1, and the setting value of the follow-up degree parameter A1 may be two values, as with another exemplary embodiment described below with reference to FIG. 11. However, the exemplary embodiment described above and another exemplary embodiment described below may be combined in a manner that depends on the scene or the field object.

FIG. 11 is a schematic flowchart illustrating an example of the object follow-up processing that may be executed by the follow-up processing unit 142 in another exemplary embodiment. Here, the setting value of the follow-up degree parameter A1 is set to two values of a relatively low value and a relatively high value. For example, the setting value of the follow-up degree parameter A1 may be two values of 0 or 1.

In step S1100, the follow-up processing unit 142 acquires each previous value of the position parameters (Ximc, Yimc) of the virtual camera 60, each previous value and each current value of the position parameters (Xchr, Ychr) of the predetermined object, and the current value of the height parameter H.

In step S1102, the follow-up processing unit 142 determines whether the current value of the height parameter H is changed with respect to the previous value in the mode of crossing a threshold value. The mode of crossing the threshold value includes a mode where the current value is greater than the threshold value when the previous value of the height parameter H is the threshold value or less, and a mode where the current value is less than the threshold value when the previous value of the height parameter H is the threshold value or more. The threshold value is any threshold value, and for example, the height of the virtual camera 60 may be a value approximately half of or significantly higher than the variable range. In addition, the threshold value may be adjustable by the user. In a case where the determination result is "YES", the process proceeds to step S1104, in the other case, the process proceeds to step S1110.

In step S1104, the follow-up processing unit 142 determines whether the current value of the height parameter H is the threshold value or more. In a case where the determination result is "YES", the process proceeds to step S1106, and in the other case, the process proceeds to step S1108.

In step S1106, the follow-up processing unit 142 sets the setting value of the follow-up degree parameter A1 to a low value (for example, 0).

In step S1108, the follow-up processing unit 142 sets the setting value of the follow-up degree parameter A1 to a high value (for example, 1).

In step S1110, the follow-up processing unit 142 calculates the current value of the direction parameter e by the processing after step S908 described above with reference to FIG. 9, on the basis of the current setting value of the follow-up degree parameter A1.

In step S1112, the follow-up processing unit 142 calculates each current value of the position parameters (Ximc, Yimc) of the virtual camera 60 by the processing described above with reference to FIG. 10, on the basis of the current value of the direction parameter θ calculated in step S1110.

In step S1114, the follow-up processing unit 142 calculates the current value of the angle of attack parameter ψ, on the basis of each current value of the position parameters (Ximc, Yimc) of the virtual camera 60, the current value of the height parameter H, and the current value of the position parameters (Xchr, Ychr) of the predetermined object.

According to the processing illustrated in FIG. 11, the same effect as that in the exemplary embodiment described above can also be obtained. According to the processing illustrated in FIG. 11, the setting value of the follow-up degree parameter A1 is two values, and thus, it is possible to reduce a processing load or a memory region.

Here, in the exemplary embodiment described above, the setting value of the follow-up degree parameter A1 is multiplied by (primarily reflected on) the direction parameter e, but is not limited thereto. That is, as with another exemplary embodiment described below with reference to FIG. 12, the setting value of the follow-up degree parameter A1 may be multiplied by (primarily reflected on) the parallel movement amount of the virtual camera 60.

Figure 12:
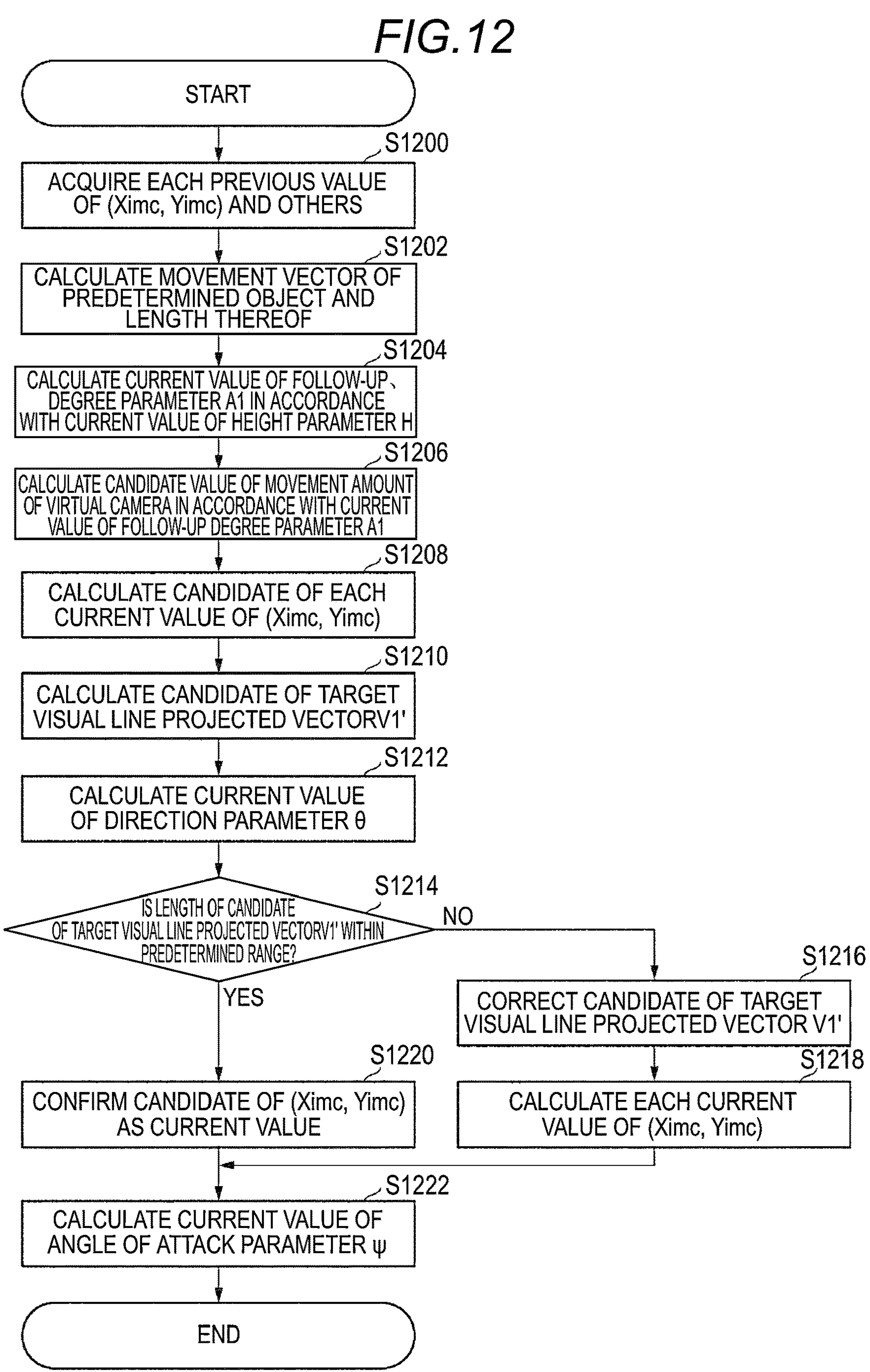
FIG. 12 is a schematic flowchart illustrating an example of the object follow-up processing that may be executed by the follow-up processing unit in still another exemplary embodiment.

FIG. 12 is a schematic flowchart illustrating an example of the object follow-up processing that may be executed by the follow-up processing unit 142 in another exemplary embodiment.

In step S1200, the follow-up processing unit 142 acquires each previous value of the position parameters (Ximc, Yimc) of the virtual camera 60, each previous value and each current value of the position parameters (Xchr, Ychr) of the predetermined object, and the current value of the height parameter H.

In step S1202, the follow-up processing unit 142 calculates the movement vector of the predetermined object and calculates the length of the movement vector (that is, the movement amount in the current period), on the basis of each previous value and each current value of the position parameters (Xchr, Ychr) of the predetermined object.

In step S1204, on the basis of the current value of the height parameter H, the follow-up processing unit 142 calculates the current value of the follow-up degree parameter A1 according to the current value. The current value of the follow-up degree parameter A1 may be calculated by the method described above with reference to FIG. 7 and FIG. 8.

In step S1206, the follow-up processing unit 142 reflects the setting value of the follow-up degree parameter Al obtained in step S1204 on the length of the movement vector of the predetermined object calculated in step S1202. Specifically, the length of the movement vector of the predetermined object is multiplied by a value obtained by subtracting the setting value of the follow-up degree parameter A1 from 1 (an example of a second coefficient). That is, in a case where the length of the movement vector of the predetermined object is set to L, $L\times(1-A1)$ is calculated. $L\times(1-A1)$ is a candidate value of the movement amount of the virtual camera 60. In this case, for the same value of L, the candidate value of the movement amount of the virtual camera 60 decreases as the setting value of the follow-up degree parameter A1 increases (becomes closer to 1).

In step S1208, the follow-up processing unit 142 calculates a position moved from each previous value of the position parameters (Ximc, Yimc) of the virtual camera 60 by the length of $L\times(1-A1)$, along the movement vector of the predetermined object calculated in step S1202, as the candidate of each current value of the position parameters (Ximc, Yimc) of the virtual camera 60.

In step S1210, the follow-up processing unit 142 calculates a vector directed toward each current value of the position parameters (Xchr, Ychr) of the predetermined object (hereinafter, also referred to as the "candidate of the target visual line projected vector V1'") from the candidate of each current value of the position parameters (Ximc, Yimc) of the virtual camera 60.

In step S1212, the follow-up processing unit 142 calculates an angle between the candidate of the target visual line projected vector V1' and the x axis (refer to FIG. 5), as the current value of the direction parameter e, on the basis of the candidate of the target visual line projected vector V1' calculated in step S1210.

In step S1214, the follow-up processing unit 142 determines whether the length of the candidate of the target visual line projected vector V1' calculated in step S1210 is within a predetermined range. The predetermined range may be the same as that in step S1006 described above with reference to FIG. 10, and is defined by predetermined lower limit value and upper limit value. In a case where the determination result is "YES", the process proceeds to step S1220. On the other hand, in a case where the determination result is "NO", the process proceeds to step S1218 through step S1216.

In step S1216, the follow-up processing unit 142 calculates the target visual line projected vector V1' by correcting the length of the candidate of the target visual line projected vector V1' to the lower limit value or the upper limit value. For example, in a case where the length of the candidate of the target visual line projected vector V1' calculated in step S1214 is greater than the upper limit value of the predetermined range, the follow-up processing unit 142 allows the length of the candidate of the target visual line projected vector V1' to be coincident with the upper limit value. In addition, in a case where the length of the candidate of the target visual line projected vector V1' calculated in step S1214 is less than the lower limit value of the predetermined range, the follow-up processing unit 142 allows the length of the candidate of the target visual line projected vector V1' to be coincident with the lower limit value.

In step S1218, the follow-up processing unit 142 calculates (backward-calculates) each current value of the position parameters (Ximc, Yimc) of the virtual camera 60, on the basis of the target visual line projected vector V1' after correction obtained in step S1216. That is, when each current value of the position parameters (Xchr, Ychr) of the predetermined object is set to the end point of the target visual line projected vector V1', the follow-up processing unit 142 calculates the start point of the target visual line projected vector V1' as each current value of the position parameters (Ximc, Yimc) of the virtual camera 60. In a case where step S1218 is ended, the process proceeds to step S1222.

In step S1220, the follow-up processing unit 142 confirms that the candidate of the target visual line projected vector V1' calculated in step S1210 as the target visual line projected vector V1', and confirms the candidate of each current value of the position parameters (Ximc, Yimc) of the virtual camera 60 calculated in step S1208 as each current value of the position parameters (Ximc, Yimc) of the virtual camera 60.

In step S1222, the follow-up processing unit 142 calculates the current value of the angle of attack parameter ψ, on the basis of each current value of the position parameters (Ximc, Yimc) of the virtual camera 60, the current value of the height parameter H, and the current value of the position parameters (Xchr, Ychr) of the predetermined object.

According to the processing illustrated in FIG. 12, the same effect as that in the exemplary embodiment described above can also be obtained. That is, according to the processing illustrated in FIG. 12, by reflecting the value obtained by subtracting the setting value of the follow-up degree parameter A1 from 1 on the change amount of the position parameters (Ximc, Yimc) of the virtual camera 60, the same effect as that in the exemplary embodiment described above can be obtained.

Note that, in the processing illustrated in FIG. 12, by correcting the length of the target visual line projected vector V1' in step S1216, the length of the target visual line projected vector V1' is adjusted to be within the predetermined range, but is not limited thereto. For example, by allowing the candidate of each current value of the position parameters (Ximc, Yimc) of the virtual camera 60 to be closer to each current value of the position parameters (Xchr, Ychr) of the predetermined object in accordance with the movement vector of the predetermined object, the length of the target visual line projected vector V1' may be adjusted to be within the predetermined range. However, in this case, the current value of the direction parameter θ is changed (and thus, the target visual line projected vector V1' is changed).

Each of the exemplary embodiments has been described in detail, but the exemplary embodiments are not limited to a specific exemplary embodiment, and various modifications and changes can be made within the scope of the claims. In addition, all or a plurality of constituents of the exemplary embodiments described above can be combined.

For example, the exemplary embodiments described above relate to the processing relevant to the game, but the follow-up of the virtual camera 60 in accordance with the movement of the predetermined object in the virtual space is not limited to the game, and can be executed even in a service accompanying a movement in a virtual space such as a metaverse. For example, in the metaverse, the follow-up of the virtual camera can be executed in accordance with the movement of the avatar as the predetermined object. Even in this case, the movement (the follow-up mode) of the virtual camera with respect to the avatar described above may be attained.

REFERENCE SIGNS LIST

1 game system
10 server device
11 server communication unit
12 server storage unit
13 server control unit
20 terminal device
21 terminal communication unit
22 terminal storage unit
23 display unit
24 input unit
25 terminal control unit
30 network
60 virtual camera
62 angle of field
70 field surface
130 drawing information storage unit
132 manipulation information acquisition unit
134 drawing data transmission unit
140 drawing processing unit
141 camera altitude change unit
142 follow-up processing unit
144 second movement processing unit
148 drawing data generation unit
1410 user setting processing unit
1412 reset processing unit
1420 change unit
1422 first movement processing unit
1423 angle of attack change unit
1424 update reflection unit

The invention claimed is:

1. An information processing device comprising a memory and processing circuitry, the processing circuitry configured to perform steps of:

moving a displayed medium in a three-dimensional virtual space with a height direction;

allowing a virtual camera to follow up the displayed medium when the displayed medium is moved, according to a follow-up mode, by automatically adjusting one or more parameters of the virtual camera based on the displayed medium being moved; acquiring user input;

setting a height of the virtual camera, in accordance with first user input;

and drawing the displayed medium in the virtual space in an expression seen from the virtual camera, wherein when a setting value according to the camera height setting is changed, the follow-up mode of the virtual camera is changed with respect to the movement of the displayed medium, wherein, in a changed follow-up mode, the one or more parameters of the virtual camera are configured to be adjusted in a different manner than for the follow-up mode.

2. The information processing device according to claim 1, wherein the virtual space includes a field extending along one or more flat surfaces or curved surfaces at an angle greater than 0 degrees with respect to the height direction, and moving the displayed medium on the field, in accordance with second user input.

3. The information processing device according to claim 1, wherein the displayed medium positioned in a first position at a first time point is moved to a second position different from the first position at a second time point, when the setting value according to the camera height setting is a first height between the first time point and the second time point, attaining a follow-up mode in which a visual line direction of the virtual camera is changed by a first angle toward the second position, and when the setting value according to the camera height setting is a second height higher than the first height between the first time point and the second time point, attaining a follow-up mode in which the visual line direction of the virtual camera is changed by a second angle less than the first angle toward the second position or the visual line direction of the virtual camera is not changed.

4. The information processing device according to claim 3, wherein the first angle or the second angle is calculated, on the basis of an angle difference between the visual line direction of the virtual camera at the first time point and the visual line direction of the virtual camera directed toward the second position.

5. The information processing device according to claim 4, wherein the first angle and the second angle is calculated by multiplying the angle difference by a first coefficient, and the first coefficient is larger and closer to 1 when the height of the virtual camera is the first height than when the height of the virtual camera is the second height.

6. The information processing device according to claim 1, wherein the displayed medium positioned in a first position at a first time point is moved to a second position different from the first position at a second time point, when the setting value according to the camera height setting is a first height between the first time point and the second time point, attaining a follow-up mode in which a movement amount of the position of the virtual camera is a first distance or 0 in a direction along a movement direction from the first position to the second position, and when the setting value according to the camera height setting is a second height higher than the first height between the first time point and the second time point, attaining a follow-up mode in which the movement amount of the position of the virtual camera is a second distance greater than the first distance in the direction along the movement direction.

7. The information processing device according to claim 6, wherein the first distance or the second distance is calculated, on the basis of a distance difference between the first position and the second position, and an angle difference between a visual line direction of the virtual camera at the first time point and the visual line direction of the virtual camera directed toward the second position.

8. The information processing device according to claim 6, wherein the first distance and the second distance is calculated by multiplying a distance difference between the first position and the second position by a second coefficient, and the second coefficient is larger and closer to 1 when the height of the virtual camera is the second height than when the height of the virtual camera is the first height.

9. The information processing device according to claim 6, wherein, both when the setting value is the first height and when the setting value is the second height, attaining the follow-up mode is in response to the displayed medium moving to the second position.

10. The information processing device according to claim 1, wherein the follow-up of the virtual camera with respect to the movement of the displayed medium is attained by a combination of a follow-up according to a change in a visual line direction of the virtual camera with respect to the movement of the displayed medium and a follow-up according to a change in the position of the virtual camera with respect to the movement of the displayed medium, and gradually decreasing a follow-up degree according to the change in the visual line direction of the virtual camera as the setting value according to the camera height setting processing increases.

11. The information processing device according to claim 1, wherein the follow-up of the virtual camera with respect to the movement of the displayed medium is attained by a combination of a follow-up according to a change in a visual line direction of the virtual camera with respect to the movement of the displayed medium and a follow-up according to a change in the position of the virtual camera with respect to the movement of the displayed medium, and gradually increasing a follow-up degree according to the change in the position of the virtual camera with respect to the movement of the displayed medium as the setting value according to the camera height setting processing increases.

12. The information processing device according to claim 1, allowing the computer to further execute resetting the setting value according to the camera height setting to an initial value or a predetermined value in a predetermined situation.

13. The information processing device according to claim 1, wherein the user input to be acquired includes input through a touch panel or input from a state of being mounted with a head mounted display.

14. The information processing device according to claim 1, wherein automatically adjusting the one or more parameters of the virtual camera is based on a magnitude of a follow-up degree parameter, and wherein the follow-up mode is changed with respect to the movement of the displayed medium by adjusting the magnitude of the follow-up degree parameter.

15. A non-transitory computer-readable medium comprising program code that, when executed on a computer comprising a memory and processing circuitry, causes the computer to execute processing of:

moving a displayed medium in a three-dimensional virtual space with a height direction;

performing camera processing of allowing a virtual camera to follow up the displayed medium when the displayed medium is moved, according to a follow-up mode, by automatically adjusting one or more parameters of the virtual camera based on the displayed medium being moved;

acquiring user input;

setting a height of the virtual camera, in accordance with first user input; and drawing the displayed medium in the virtual space in an expression seen from the virtual camera, wherein when a setting value of the height of the virtual camera is changed, performing the camera processing includes changing the follow-up mode of the virtual camera with respect to the movement of the displayed medium, wherein, in a changed follow-up mode, the one or more parameters of the virtual camera are configured to be adjusted in a different manner than for the follow-up mode.

16. An information processing device comprising a memory and processing circuitry, the processing circuitry configured to perform steps of:

moving a displayed medium in a three-dimensional virtual space with a height direction;

allowing a virtual camera to follow up the displayed medium when the displayed medium is moved, according to a follow-up mode, by automatically adjusting one or more parameters of the virtual camera based on the displayed medium being moved;

acquiring user input;

setting a height of the virtual camera, in accordance with first user input; and drawing the displayed medium in the virtual space in an expression seen from the virtual camera, wherein when a setting value is changed, the processing circuitry is configured to change the follow-up mode of the virtual camera with respect to the movement of the displayed medium, wherein, in a changed follow-up mode, the one or more parameters of the virtual camera are configured to be adjusted in a different manner than for the follow-up mode.

* * * * *